United States Patent
Gorny et al.

(10) Patent No.: US 12,531,918 B2
(45) Date of Patent: *Jan. 20, 2026

(54) MIXING AND TRANSMITTING MULTIPLEX AUDIOVISUAL INFORMATION

(71) Applicant: Nextiva, Inc., Scottsdale, AZ (US)

(72) Inventors: Tomas Gorny, Scottsdale, AZ (US); Jean-Baptiste Martinoli, St Anaclet de Lesard (CA); Tracy Conrad, Scottsdale, AZ (US); Lukas Gorny, Scottsdale, AZ (US)

(73) Assignee: Nextiva, Inc., Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/244,082

(22) Filed: Sep. 8, 2023

(65) Prior Publication Data
US 2023/0421621 A1    Dec. 28, 2023

Related U.S. Application Data

(63) Continuation of application No. 16/836,282, filed on Mar. 31, 2020, now Pat. No. 11,765,213.
(Continued)

(51) Int. Cl.
*H04L 65/403* (2022.01)
*H04L 65/1069* (2022.01)
*H04L 65/1096* (2022.01)

(52) U.S. Cl.
CPC ........ *H04L 65/403* (2013.01); *H04L 65/1069* (2013.01); *H04L 65/1096* (2013.01)

(58) Field of Classification Search
CPC ............... H04L 65/403; H04L 65/1069; H04L 65/1096
See application file for complete search history.

(56) References Cited

U.S. PATENT DOCUMENTS 8,144,633 B2    3/2012    Yoakum et al.
8,581,958 B2    11/2013    Baker et al.
(Continued)

OTHER PUBLICATIONS

International Search Report for Application No. PCT/US2020/036994 dated Aug. 20, 2020. 2 Pages.
(Continued)

*Primary Examiner* — Brian J. Gillis
*Assistant Examiner* — Juan C Turriate Gastulo
(74) *Attorney, Agent, or Firm* — Spencer Fane LLP; Steven J. Laureanti

(57) ABSTRACT

A system and method are disclosed for generating a teleconference space for two or more communication devices using a computer coupled with a database and comprising a processor and memory. The computer generates a teleconference space and transmits requests to join the teleconference space to the two or more communication devices. The computer stores in memory identification information for each of the two or more communication devices. Each of the two or more communication devices transmits a communication system stream, comprising audiovisual information recorded by each communication device, to the computer. The computer stores each of the communication system streams in memory, and generates an outbound teleconference stream comprising at least one of the two or more communication system streams. The computer transmits the outbound teleconference stream to each of the two or more communication devices.

11 Claims, 3 Drawing Sheets

Related U.S. Application Data

(60) Provisional application No. 62/859,878, filed on Jun. 11, 2019.

(56) References Cited

U.S. PATENT DOCUMENTS

| | | | |
|---|---|---|---|
| 8,782,271 | B1 | 7/2014 | Ellner |
| 8,791,982 | B1* | 7/2014 | Ellner .................. H04M 3/567 379/202.01 |
| 8,966,095 | B2* | 2/2015 | Mostafa ................. H04N 7/15 709/227 |
| 9,652,113 | B1 | 5/2017 | Colson et al. |
| 9,979,769 | B2 | 5/2018 | Pilli et al. |
| 10,334,206 | B2 | 6/2019 | Periyannan et al. |
| 10,348,784 | B2 | 7/2019 | Qian et al. |
| 10,541,824 | B2 | 1/2020 | Bader-Natal et al. |
| 10,659,729 | B2 | 5/2020 | Pell |
| 10,931,725 | B2 | 2/2021 | Garrido et al. |
| 11,228,625 | B1* | 1/2022 | Libin .................. G06V 40/176 |
| 11,356,488 | B2 | 6/2022 | Mackell et al. |
| 2007/0109978 | A1* | 5/2007 | Miriyala ............. H04L 12/1813 370/260 |
| 2007/0285505 | A1* | 12/2007 | Korneliussen ......... H04N 7/147 348/E7.083 |
| 2013/0063542 | A1* | 3/2013 | Bhat .................. H04L 12/1822 348/E7.083 |
| 2013/0169742 | A1* | 7/2013 | Wu ....................... H04L 51/10 348/E7.083 |
| 2013/0198629 | A1 | 8/2013 | Tandon et al. |
| 2014/0267569 | A1* | 9/2014 | Periyannan ............ H04N 7/152 348/14.08 |
| 2016/0249108 | A1 | 8/2016 | Sexton |
| 2017/0060917 | A1* | 3/2017 | Marsh ................ H04L 65/1069 |
| 2018/0174600 | A1* | 6/2018 | Chaudhuri ....... H04N 21/44008 |
| 2018/0190266 | A1 | 7/2018 | Sun et al. |
| 2021/0368134 | A1* | 11/2021 | Rajamani ................ H04N 7/15 |
| 2022/0107779 | A1* | 4/2022 | Abhishek ................ G06F 3/165 |

OTHER PUBLICATIONS

Extended European Search Report for Application No. EP 20822898 dated Dec. 16, 2022. 9 Pages.

* cited by examiner

MIXING AND TRANSMITTING MULTIPLEX AUDIOVISUAL INFORMATION

CROSS-REFERENCE TO RELATED APPLICATIONS

This application is a continuation of U.S. patent application Ser. No. 16/836,282, filed Mar. 31, 2020, entitled "Mixing and Transmitting Multiplex Audiovisual Information," which claims the benefit under 35 U.S.C. § 119(e) to U.S. Provisional Application No. 62/859,878, filed Jun. 11, 2019, entitled "Mixing and Transmitting Multiplex Audiovisual Information." U.S. patent application Ser. No. 16/836,282 and U.S. Provisional Application No. 62/859,878 are assigned to the assignee of the present application.

TECHNICAL FIELD

The present disclosure relates generally to electronic teleconference systems and more specifically to systems and methods to mix and transmit multiplex audiovisual information during electronic teleconferences.

BACKGROUND

Teleconference systems may utilize communication networks, including but not limited to the internet, to connect communication systems such as computers, tablet computers, and/or smartphones. Teleconference systems may permit communication systems to share visual imagery and audio data associated with a speaking user with other communication systems. However, teleconference systems connecting more than a small number of communication systems may exhibit serious network bandwidth requirements, draining system resources and preventing teleconferences between a large number of participating communication systems simultaneously.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to more detailed descriptions presented below.

In embodiments of the disclosed subject matter, the unique systems and methods described herein make use of an exemplary system and method to mix and transmit multiplex audiovisual information during electronic teleconferences. Embodiments of the disclosed subject matter include two or more communication systems, including but not limited to tablet computers or smartphones, and a computer coupled with a database and comprising a processor and memory. The computer generates a teleconference space and transmits requests to join the teleconference space to the two or more communication systems. The computer stores in memory identification information for each of the two or more communication systems. Each of the two or more communication systems transmits a communication system stream, comprising audiovisual information recorded by each communication device, to the computer.

In embodiments of the disclosed subject matter, the computer stores each of the communication system streams in memory, and generates an outbound teleconference stream comprising at least one of the two or more communication system streams. The computer transmits the outbound teleconference stream to each of the two or more communication systems.

These and other features of the disclosed subject matter are described in greater detail below.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

DETAILED DESCRIPTION

Figure 1:
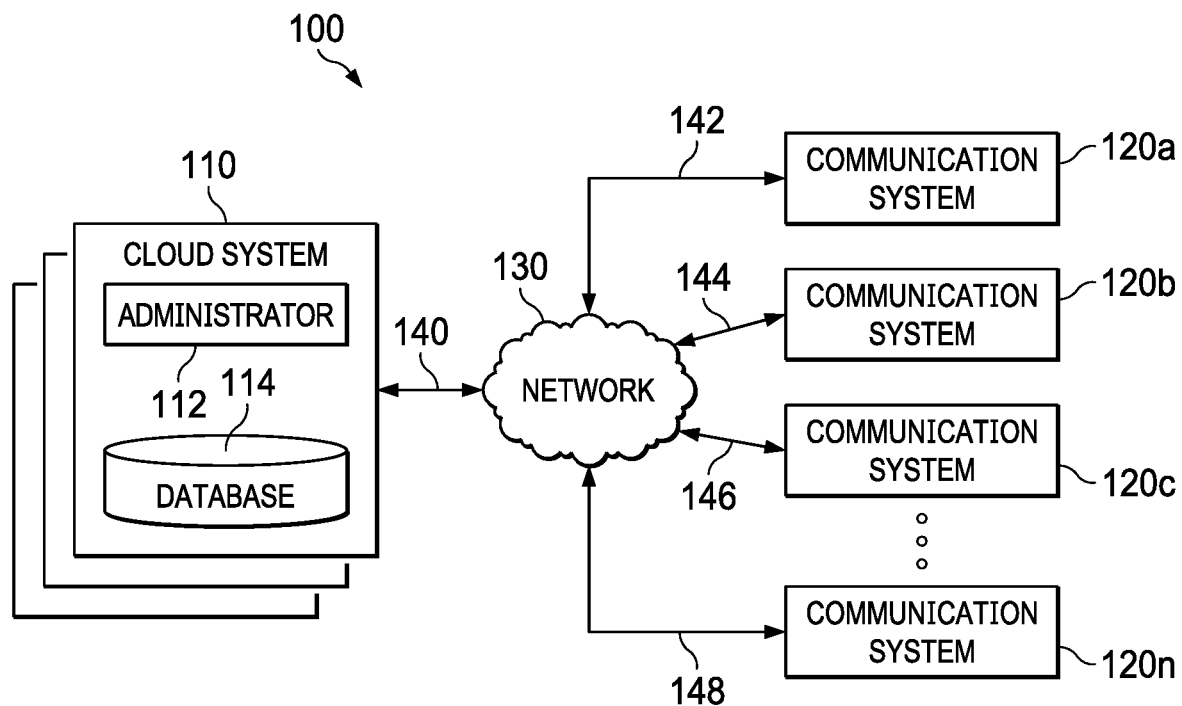
FIG. 1 illustrates an exemplary teleconference system, according to a first embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

As described more fully below, aspects of the following disclosure relate to receiving, mixing and transmitting multiplex audiovisual information to support teleconferencing between a large number of simultaneous participants with reduced bandwidth. Embodiments of the following disclosure generate a teleconference space including a plurality of communication systems, each controlled by an individual user or group of users. Embodiments of the teleconference space comprise a visual component, which may include live video imagery, and an audio component, which may comprise live audio from a speaking user. Embodiments receive incoming audiovisual information from each of the plurality of communication systems and mix the incoming audiovisual information into a single multiplex outbound teleconference stream. Embodiments transmit the outbound teleconference stream from one or more cloud systems to the separate communication systems. During the process of mixing the incoming audiovisual information from separate communication systems into the single outbound teleconference stream, embodiments select one or more incoming video and audio streams from one or more communication systems to emphasize in the single outbound teleconference stream.

Embodiments of the following disclosure enable the transmission of teleconference streams comprising audiovisual information from a large number of communication systems with reduced bandwidth data requirements. Embodiments may also permit one or more participating communication systems to customize aspects of the teleconference stream, including but not limited to teleconference displays transmitted from one or more other communication systems, without affecting the single outbound teleconference stream that embodiments transmit to other communication systems.

FIG. 1 illustrates exemplary teleconference system 100, according to a first embodiment. Teleconference system 100 comprises one or more cloud systems 110, one or more communication systems 120, network 130, and communication links 140-148. Although one or more cloud systems 110, communication systems 120a-120n, single network 130, and communication links 140-148 are shown and described, embodiments contemplate any number of cloud systems 110, communication systems 120, networks 130, or communication links 140-148, according to particular needs.

In one embodiment, cloud system 110 comprises administrator 112 and database 114. Administrator 112 is programmed to generate a teleconference space in which one or more communication systems 120 may participate. Administrator 112 receives and mixes incoming audiovisual information from each communication system 120 into the single outbound teleconference stream, and transmits the outbound teleconference stream to each of one or more communication systems 120. Database 114 comprises one or more databases 114 or other data storage arrangements at one or more locations local to, or remote from, cloud system 110. In one embodiment, one or more databases 114 is coupled with the one or more administrators 112 using one or more local area networks (LANs), metropolitan area networks (MANs), wide area networks (WANs), or aforementioned network 130, such as, for example, the Internet, or any other appropriate wire line, wireless link, or any other communication links 140-148. One or more databases 114 stores data that is made available to and may be used by one or more administrators 112 according to the operation of teleconference system 100. According to embodiments, administrator 112 hosts and runs one or more runtime processes associated with cloud system 110.

According to embodiments, each of one or more communication systems 120 comprises one or more users such as, for example, an individual person or customer, one or more employees or teams of employees within a business, or any other individual, person, group of persons, business, or enterprise which communicates or otherwise interacts with one or more other communication systems 120. Although an exemplary number of communication systems 120a-120n are shown and described, embodiments contemplate any number of communication systems 120 interacting with network 130 and one or more cloud systems 110 according to particular needs. As an example only and not by way of limitation, teleconference system 100 may allow up to 50, 100, 500, or 1,000 separate communication systems 120 to join and participate in the teleconference space simultaneously.

Each of one or more communication systems 120 comprises one or more communication devices, such as, for example, cellular phones or smartphones, desktop computers, laptop computers, notebook computers, tablet-type devices, terminals, or any other communication device capable of receiving, transmitting, and displaying audiovisual information through network 130. In an embodiment, each of one or more communication devices may comprise a device containing an audiovisual recording device, such as a computer camera and microphone, and an audiovisual display device, such as an electronic display screen and one or more speakers. The communication device audiovisual display devices permit each of one or more users interacting with each of one or more communication devices to see and hear the visual and audio components of the teleconference space. The communication device audiovisual recording devices record audiovisual information regarding the one or more users associated with the one or more communication devices, which one or more communication systems 120 transmits, using network 130 and communication links 140-148, to cloud system 110 or to other communication systems 120.

Each of one or more communication systems 120 may comprise a processor, memory and data storage. The processor may execute an operating system program stored in memory to control the overall operation of the one or more communication devices associated with each of one or more communication systems 120. For example, the processor may control the reception of signals and the transmission of signals within teleconference system 100. The processor may execute other processes and programs resident in memory, such as, for example, registration, identification or communication over communication links 140-148, and moving data into or out of the memory, as required by an executing process.

Each of one or more communication systems 120 and the one or more communication devices that comprise each of one or more communication systems 120 may be coupled with other communication systems 120, as well as one or more cloud systems 110, by network 130 via communication links 142-148. Although communication links 142-148 are illustrated connecting each of one or more communication systems 120, respectively, to network 130, embodiments contemplate any number of communication links 142-148 connecting any number of communication systems 120 with network 130, according to particular needs. In other embodiments, communication links 140-148 may connect one or more communication systems 120 directly to one or more cloud systems 110 and/or one or more other communication systems 120 and/or communication devices.

According to embodiments, one or more communication links 140-148 couple one or more cloud systems 110, including administrator 112 and database 114, and one or more communication systems 120 with network 130. Each communication link 140-148 may comprise any wireline, wireless, or other link suitable to support data communications between one or more cloud systems 110 and network 130. Although communication links 140-148 are shown as generally coupling one or more cloud systems 110 and one or more communication systems 120 with network 130, one or more cloud systems 110 and one or more communication systems 120 may communicate directly with each other according to particular needs.

According to embodiments, network 130 includes the Internet, telephone lines, any appropriate LANs, MANs, or WANs, and any other communication network coupling one or more cloud systems 110 and one or more communication systems 120. For example, data may be maintained by one or more cloud systems 110 at one or more locations external to one or more cloud systems 110, and made available to one or more cloud systems 110 or one or more communication systems 120 using network 130, or in any other appropriate manner.

According to embodiments, one or more cloud systems 110 and/or one or more communication systems 120 may each operate on one or more computers that are integral to or separate from the hardware and/or software that supports teleconference system 100. In addition, or as an alternative, the one or more users may be associated with teleconference system 100 including one or more cloud systems 110 and/or one or more communication systems 120. These one or more users may include, for example, one or more computers programmed to autonomously generate a teleconference space and to receive, mix, and transmit multiplex audiovisual information in the teleconference space. As used herein, the computer, the term "computer," and "computer system" comprise an input device and an output device. The computer input device includes any suitable input device, such as a keypad, mouse, touch screen, microphone, or other device to input information. The computer output device comprises any suitable output device that may convey information associated with the operation of teleconference system 100, including digital or analog data, visual information, or audio information. Furthermore, the one or more computers include any suitable fixed or removable non-transitory computer-readable storage media, such as magnetic computer disks, CD-ROMs, or other suitable media to receive output from and provide input to teleconference system 100. The one or more computers also include one or more processors and associated memory to execute instructions and manipulate information according to the operation of teleconference system 100.

Embodiments contemplate one or more cloud systems 110 generating a teleconference space. Each of one or more communication systems 120 may connect to one or more cloud systems 110 using network 130 and communication links 140-148, and may participate in the teleconference space. The teleconference space allows one or more communication systems 120 to conduct and participate in an audiovisual meeting, such as but not limited to an audiovisual teleconference or an audiovisual presentation, using the communication devices. The teleconference space may comprise a visual component and/or an audio component. The visual component may comprise live video imagery of one or more speaking users associated with one or more communication systems 120. The audio component may comprise live audio from one or more currently-speaking users associated with one or more communication systems 120.

According to embodiments, each of one or more communication systems 120 participating in the teleconference space uses an audiovisual recording device to record audiovisual information pertaining to the one or more users associated with each of one or more communication systems 120. Each of one or more communication systems 120 transmits the audiovisual information, comprising a visual component and an audio component, to cloud system 110 as a unique incoming audiovisual stream (henceforth, "communication system stream"). In addition, or as an alternative, each of one or more communication systems 120 transmits a priority signal, comprising a binary value specifying whether the audiovisual recording device associated with each communication system 120 is currently detecting audible sound, to cloud system 110.

Cloud system 110 stores each incoming communication system stream in cloud system 110 database. Cloud system 110 selects, from communication system streams stored in cloud system 110 database, one or more communication system streams to comprise a separate, outbound teleconference stream which cloud system 110 transmits to each of one or more communication systems 120 using network 130 and communication links 140-148. Cloud system 110 transmits the single outbound teleconference stream, including its visual and audio components, to each of one or more communication systems 120. Each communication system 120 displays the visual and audio components of the outbound teleconference stream on its one or more associated communication devices. As the teleconference progresses, cloud system 110 continually updates which of the one or more communication system streams is selected to comprise the outbound teleconference stream, according to one or more evaluation criteria. For example, in an embodiment, cloud system 110, after generating a teleconference space, selects communication system streams of the first six communication systems 120 to join the teleconference space to comprise the initial outbound teleconference stream, which cloud system 110 transmits to each of one or more communication systems 120. However, as soon as the total number of separate communication systems 120 participating in the teleconference space increases to seven or more communication systems 120, cloud system 110 instead selects communication system streams of the six communication systems 120 which most recently transmitted an active priority signal (which may indicate that one or more users associated with these communication systems 120 were recently speaking into the audiovisual recording devices associated with these communication systems 120) to comprise the ongoing outbound teleconference stream.

Figure 2:
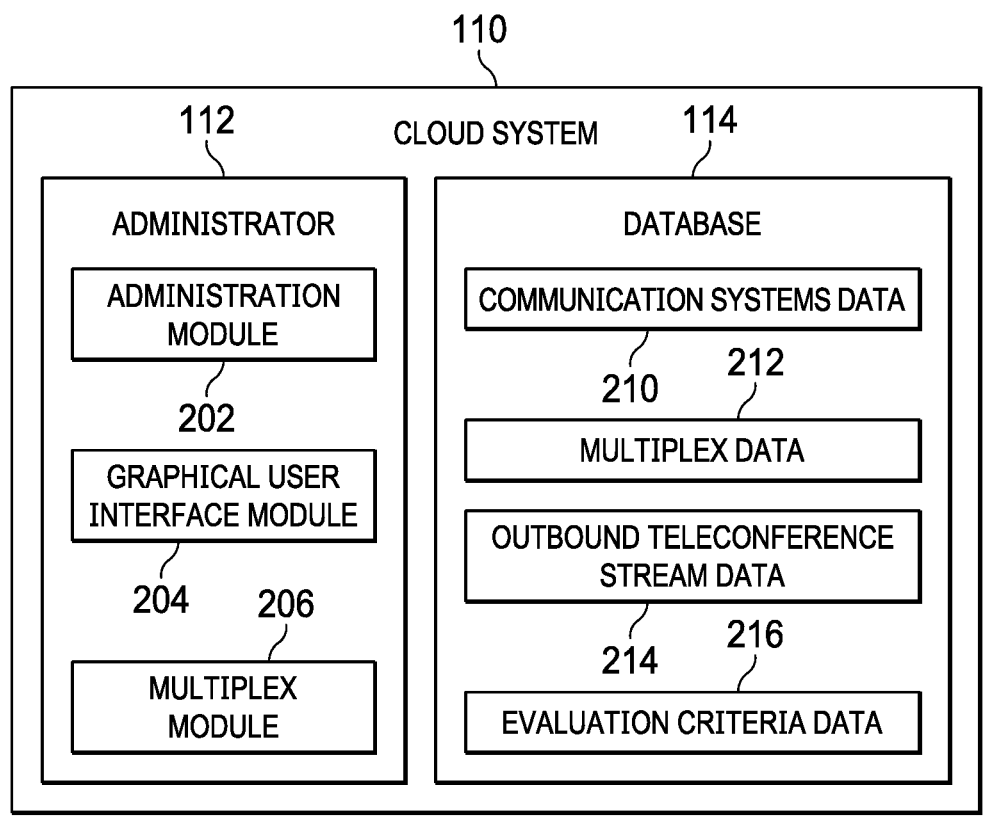
FIG. 2 illustrates the cloud system of FIG. 1 in greater detail, according to an embodiment.

FIG. 2 illustrates cloud system 110 of FIG. 1 in greater detail, according to an embodiment. As described above, cloud system 110 may comprise one or more computers at one or more locations including associated input devices, output devices, non-transitory computer-readable storage media, processors, memory, or other components to send and receive information between one or more communication systems 120 according to the operation of teleconference system 100. In addition, cloud system 110 comprises administrator 112 and database 114. Although cloud system 110 is illustrated and described as comprising single administrator 112 and database 114, embodiments contemplate any suitable number of administrators 112 or databases 114 internal to or externally coupled with cloud system 110. In addition, or as an alternative, cloud system 110 may be located internal or external to one or more communication systems 120. For example, cloud system 110 may be located external to one or more communication systems 120 and may be located in, for example, a corporate or regional entity of one or more communication systems 120, according to particular needs.

According to embodiments, administrator 112 comprises administration module 202, graphical user interface module 204, and multiplex module 206. Although a particular configuration of administrator 112 is shown and described, embodiments contemplate any suitable number or combination of administration modules 202, graphical user interface modules 204, and multiplex modules 206, located at one or more locations, local to, or remote from, cloud system 110, according to particular needs. In addition, or as an alternative, administration module 202, graphical user interface module, and multiplex module 206 may be located on multiple administrators 112 or computers at any location in teleconference system 100.

Database 114 comprises communication systems data 210, multiplex data 212, outbound teleconference stream data 214, and evaluation criteria data 216. Although database 114 is shown and described as comprising communication systems data 210, multiplex data 212, outbound teleconference stream data 214, and evaluation criteria data 216, embodiments contemplate any suitable number or combination of communication systems data 210, multiplex data 212, outbound teleconference stream data 214, evaluation criteria data 216, and/or other data pertaining to teleconference system 100 located at one or more locations, local to, or remote from, cloud system 110, according to particular needs.

Communication systems data 210 of database 114 contains the identification information of one or more communication systems 120, such as, for example, names and addresses of the one or more users associated with each of one or more communication systems 120, company contact information, telephone numbers, email addresses, IP addresses, and the like. According to embodiments, identification information may also comprise information regarding the operating systems of each of one or more communication systems 120, internet browser information regarding each of one or more communication devices associated with each of one or more communication systems 120, or system specifications (such as, for example, processor speed, available memory, hard drive space, and the like) for each of one or more communication devices associated with each of one or more communication systems 120.

Communication systems data 210 may also include end user ID information, end user personal identification number (PIN) information, communication system 120 ID information, communication system 120 MAC address information, or any other type of information which cloud system 110 may use to identify and track each of one or more communication systems 120 participating in teleconference system 100. Communication systems data 210 may further comprise identification data which identifies and tracks each of one or more communication devices which comprise each of one or more communication systems 120. Although particular communication systems data 210 are described, embodiments contemplate any type of communication systems data 210 associated with one or more communication systems 120 or communication devices, according to particular needs. In an embodiment, cloud system 110 uses communication systems data 210 to identify one or more participating communication systems 120 in teleconference system 100 in order to aid the selection of one or more communication system streams to comprise the outbound teleconference stream, such as by prioritizing communication system streams of predetermined very important person (VIP) communication systems 120. In another embodiment, cloud system 110 uses communication systems data 210 to generate a teleconference space which specifically includes only identified communication systems 120, such as in the case of a private teleconference space.

According to embodiments, multiplex data 212 of database 114 may comprise real-time or stored data files comprising each communication system stream of one or more communication systems 120 participating in the teleconference space. As described above, each of one or more communication systems 120 records a communication system stream, comprising a visual component and an audio component, and transmits the communication system stream, using network 130 and one or more communication links 140-148, to cloud system 110. Cloud system 110 stores data pertaining to each incoming communication system streams in multiplex data 212 of database 114. According to embodiments, multiplex data 212 may retain data pertaining to each of one or more communication system streams only for the length of time in which the plurality of communication devices participate in the teleconference space; in other embodiments, multiplex data 212 stores and retains data pertaining to each of one or more communication system streams after the teleconference space terminates.

Outbound teleconference stream data 214 comprises data related to the outbound teleconference stream, which cloud system 110 transmits to one or more communication systems 120. Cloud system 110 selects, from multiplex data 212, one or more communication system streams to comprise the outbound teleconference stream, according to one or more evaluation criteria. Cloud system 110 transmits this single outbound teleconference stream to each of one or more communication systems 120 participating in the teleconference space, using network 130 and one or more communication links 140-148. According to embodiments, database 114 may store data comprising a copy of the transmitted outbound teleconference stream in outbound teleconference stream data 214, which may permit one or more communication systems 120 to access and display a recording of the outbound teleconference stream at a later time.

Evaluation criteria data 216 comprises data related to one or more evaluation criteria which multiplex module 206 uses to select the outbound teleconference stream from the one or more communication system streams stored in multiplex data 212.

Administration module 202 of administrator 112 may configure, update, and/or manage the operation of cloud system 110. In an embodiment, administration module 202 may configure, update, and/or manage the broader operation of teleconference system 100 and change which data is executed and/or stored on one or more cloud systems 110 and/or one or more communication systems 120. Teleconference system 100 may comprise a user-configurable system, such that cloud system 110 administrator may store communication systems data 210, multiplex data 212, and/or outbound teleconference stream data 214 either singularly or redundantly in cloud system 110 database and/or one or more communication systems 120, according to particular needs. In other embodiments, administration module 202 monitors, processes, updates, creates, and stores communication systems data 210, multiplex data 212, and/or outbound teleconference stream data 214 in cloud system 110 database.

According to embodiments, administration module 202 may generate a teleconference space, which one or more communication systems 120 may join. When communication system 120 joins the teleconference space, administration module 202 may record unique identifying information regarding communication system 120, such as by assigning communication system 120 a unique ID or by recording the IP or MAC address of communication system 120, in communication systems data 210. Administration module 202 may receive one or more communication system streams from each of one or more communication systems 120 participating in the teleconference space, and may store data related to each of these one or more communication system streams in multiplex data 212. Administration module 202 may also receive, from each of one or more communication systems 120, a priority signal, comprising a binary value which specifies whether the audiovisual recording device of communication system 120 is currently detecting audible sound input, and may store the one or more priority signals in multiplex data 212. In other embodiments, administration module may receive a "recently joined" signal from one or more communication systems 120 that have recently connected to the teleconference space.

Graphical user interface module 204 of administrator 112 generates the outbound teleconference stream, which administration module 202 transmits to one or more communication systems 120 using network 130 and the one or more communication links 140-148. More specifically, graphical user interface module 204 receives input from multiplex module 206, discussed in more detail below, regarding which of the one or more communication system streams stored in multiplex data 212 should be chosen to transmit back to the one or more communication devices as the outbound teleconference stream. Based on multiplex module 206 input, graphical user interface module 204 selects one or more communication system streams and generates an outbound teleconference stream, which administration module 202 transmits to one or more communication systems 120 participating in the teleconference space. Graphical user interface module 204 stores and retrieves data from cloud system 110 database including communication systems data 210, multiplex data 212, and outbound teleconference stream data 214, in the process of generating the outbound teleconference stream. Graphical user interface module 204 may generate different graphical user interface displays conveying different types of information, according to embodiments.

Multiplex module 206 of administrator 112 monitors the one or more incoming communication system streams, which administration module 202 stores in multiplex data 212. Multiplex module 206 continuously determines, according to one or more evaluation criteria and/or one or more priority signals, which of the one or more incoming communication system streams should comprise the outgoing outbound teleconference stream. For example, multiplex module 206 may monitor the audio components of each of communication system streams and access the priority signal information stored in multiplex data 212 in order to determine which users participating in the teleconference space are speaking, and which users are silent, at any given time. Multiplex module 206 may select the one or more communication system streams in which users are currently speaking as the current outgoing outbound teleconference stream. Multiplex module 206 transmits the selection information to graphical user interface module 204, which generates the current outbound teleconference stream. Administration module 202 then transmits the outbound teleconference stream to one or more communication systems 120.

In an embodiment, multiplex module 206 of cloud system 110 accesses one or more evaluation criteria, stored in evaluation criteria data 216, to select which of the one or more communication system streams will function as the outbound teleconference stream. According to embodiments, multiplex module 206 may access and use a "who is speaking" evaluation criterion to identify spoken words in communication system streams and to select one communication system stream in which the user is presently speaking to serve as the outbound teleconference stream. In embodiments of the teleconferencing system in which more communication systems 120 participate in the teleconference space, multiplex module 206 may select communication system streams by searching for the presence of predetermined keywords stored in evaluation criteria data 216 (such as, for example, "wait") in the audio components of each communication system stream. Multiplex module 206 may identify particular communication system streams by using communication systems data 210 to identify communication systems 120 transmitting each stream, and may preferentially select (or avoid) particular communication system streams to serve as the outbound teleconference stream based on predetermined selection information. In other embodiments, one or more users associated with one or more communication systems 120 may manually instruct multiplex module 206 to select specific communication system streams to serve as the outbound teleconference stream.

Although particular examples of evaluation criteria are described herein, embodiments contemplate multiplex module 206 using any evaluation criteria to select one or more communication system streams to serve as the outbound teleconference stream, according to embodiment needs. For example, in an embodiment, administration module 202 generates a teleconference space, which one or more communication systems 120 join. As communication systems 120 join the teleconference space, each communication system 120 transmits communication system stream to administration module 202. Administration module 202 stores each incoming communication system stream in multiplex data 212. In this example, multiplex module 206 accesses evaluation criteria data 216 which specifies which communication system streams will comprise the outbound teleconference stream in the following manner: multiplex module 206 initially selects each communication system streams from the first six communication systems 120 to join the teleconference space to comprise the outbound teleconference stream. However, as soon as the total number of separate communication systems 120 participating in the teleconference space increases to seven or more communication systems 120, multiplex module 206 will then select communication system streams of the six communication systems 120 which most recently transmitted an active priority signal (which may indicate that one or more users associated with the communication systems 120 were recently speaking into the audiovisual recording devices associated with the communication systems 120) to comprise the ongoing outbound teleconference stream. Although particular examples of evaluation criteria data 216 are described in this example, embodiments contemplate multiplex module 206 utilizing any form of evaluation criteria data 216 to select communication system streams, according to particular needs.

Continuing the example, multiplex module 206 utilizes the above-described evaluation criteria data 216 and selects each communication system streams transmitted by the first six communication devices to join the teleconference space. As described above, multiplex module 206 transmits this communication system stream selection information to graphical user interface module 204. Graphical user interface module 204 generates the outbound teleconference stream using the selected communication system streams, and administration module 202 transmits the outbound teleconference stream to communication systems 120 participating in the teleconference space. When multiplex module 206 detects there are seven or more incoming communication system streams stored in multiplex data 212, multiplex module 206, applying evaluation criteria data 216 described above, now selects communication system streams of the six communication systems 120 which most recently transmitted an active priority signal to comprise the outbound teleconference stream. Multiplex module 206 transmits this updated communication system stream selection information to graphical user interface module 204. Graphical user interface module 204 generates the outbound teleconference stream using the selected communication system streams, and administration module 202 transmits the outbound teleconference stream to communication systems 120 participating in the teleconference space.

Figure 3:
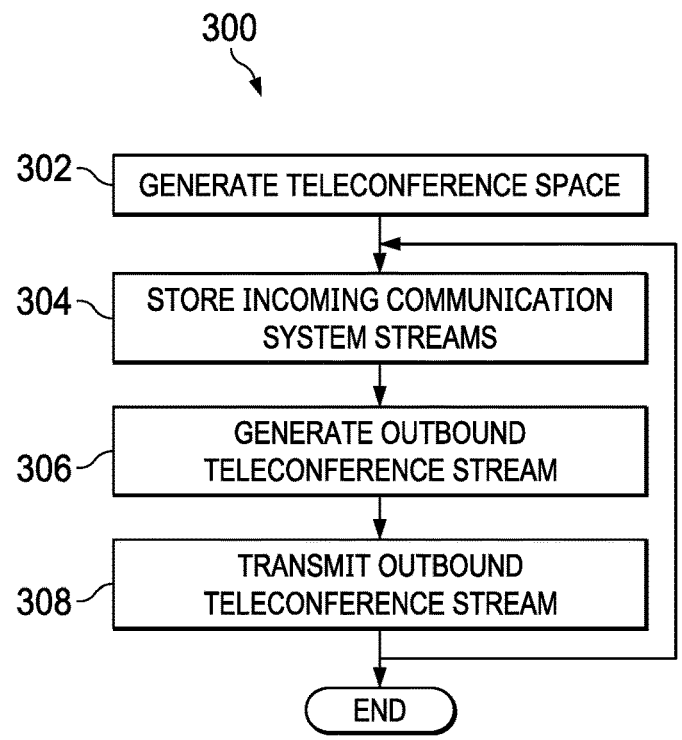
FIG. 3 illustrates an exemplary method of generating and operating a teleconference space, according to an embodiment.

FIG. 3 illustrates exemplary method 300 of generating and operating a teleconference space, according to an embodiment. Although the actions of method 300 are described in a particular order, one or more actions may be performed in one or more combinations or permutations according to particular needs.

At action 302, administration module 202 of teleconference system 100 generates a teleconference space and transmits, via network 130 and communication links 140-148, requests to join the teleconference space to one or more communication systems 120. One or more communication systems 120 may respond to input from one or more associated users, and may join the teleconference space via network 130 and communication links 140-148. Administration module 202 records unique identifying information regarding each participating communication system 120 in communication systems data 210.

At action 304, teleconference system 100 stores incoming communication streams. Each of one or more participating communication systems 120 transmits to cloud system 110 a communication system stream. According to embodiments, communication system streams may comprise audiovisual information (in the form of a visual component and an audio component) recorded by the audiovisual recording device associated with each communication system 120. Administration module 202 stores each communication system stream in multiplex data 212 of database 114.

At action 306, teleconference system 100 generates an outbound teleconference stream. Multiplex module 206 chooses one or more communication system streams to constitute the outbound teleconference stream, using one or more evaluation criteria chosen from evaluation criteria data 216. Graphical user interface module 204 accesses the communication system streams stored in multiplex data 212, and generates an outbound teleconference stream that incorporates the communication system streams chosen by multiplex module 206. Graphical user interface module 204 stores the outbound teleconference stream in outbound teleconference stream data 214.

At action 308, administration module 202 transmits, using network 130 and communication links 140-148, the outbound teleconference stream to each participating communication system 120. Each communication system 120 displays the outbound teleconference stream using an associated audiovisual display device. In an embodiment, teleconference system 100 returns to action 304 and continues to store incoming communication system streams, generate outbound teleconference streams, and transmit outbound teleconference streams substantially continuously. In this embodiment, multiplex module 206 continuously monitors each incoming communication system stream according to one or more evaluation criteria, and graphical user interface module 204 continuously updates the outbound teleconference stream as different communication systems 120, including one or more users associated with each communication system 120, join and participate in the teleconference space. The teleconference system 100 concludes method 300 when the teleconference terminates.

To illustrate the operation of teleconference system 100 implementing method 300 to generate and operate a teleconference space, the following example is proved. In this example, exemplary teleconference system comprises cloud system 110, three communication systems 120 comprising communication device computers 122a-122c, network 130, and communication links 140-146 connecting cloud system 110 and computers 122a-122c to network 130. In this example, a single user, in the form of an individual person, is associated with each of the three communication system 120 computers 122a-122c, such that a total of three persons will participate in teleconference system 100.

Figure 4:
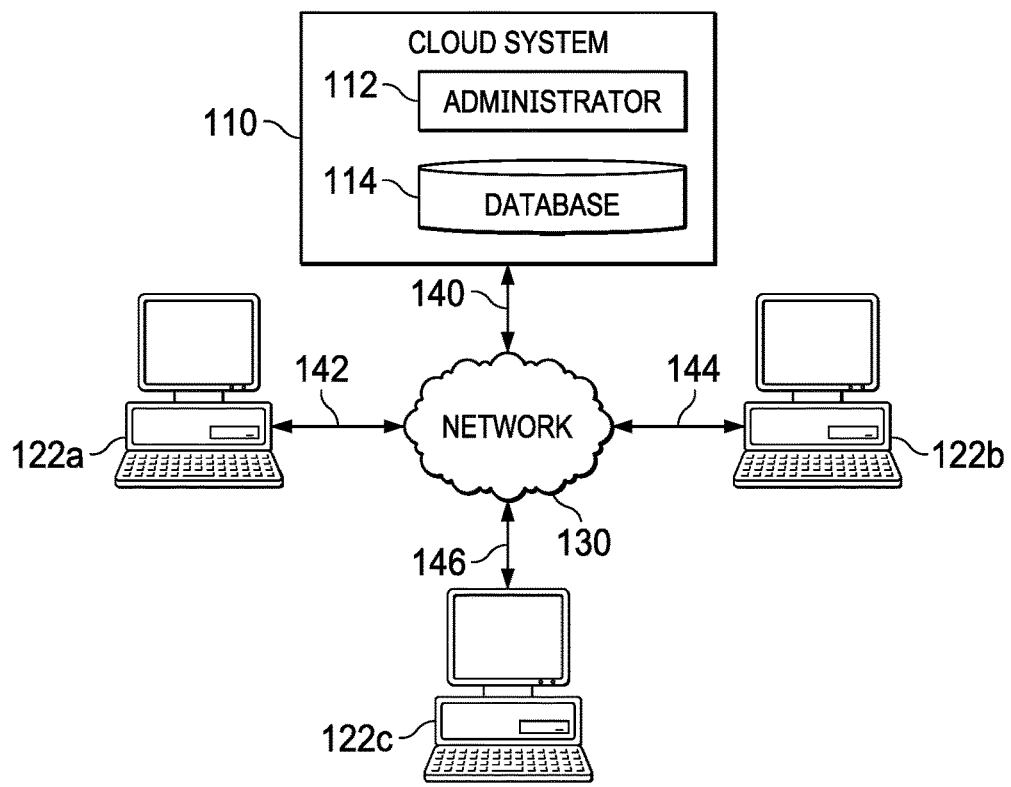
FIG. 4 illustrates an exemplary teleconference system comprising a cloud system, computers, network, and communication links, according to an embodiment.

FIG. 4 illustrates exemplary teleconference system 100 comprising cloud system 110, computers 122a-122c, network 130, and communication links 140-146, according to an embodiment. In this exemplary embodiment, computer 122a transmits a request to cloud system 110 to generate a teleconference space, which will enable the user associated with computer 122a to deliver a presentation to the users of computers 122b-122c.

Continuing the example, at action 302 of method 300, administration module 202 generates an initial teleconference space and transmits, via network 130 and communication links 140-146, requests to join the teleconference space to computers 122a-122c. Each of computers 122a-122c responds to input from the user associated with each of computers 122a-122c, and computers 122a-122c join the teleconference space via network 130 and communication links 142-146. Administration module 202 records unique identifying information regarding each of computers 122a-122c in communication systems data 210.

Continuing the example, at action 304, the audiovisual recording device associated with each of computers 122a-122c records user audiovisual information. Each of computers 122a-122c transmits the recorded audiovisual information as a communication system stream, comprising a visual component and an audio component, to cloud system 110. Administration module 202 stores each communication system stream transmitted by computers 122a-122c in multiplex data 212 of database 114.

Continuing the example, at action 306, multiplex module 206 chooses which of the three incoming communication system streams will constitute the outbound teleconference stream using evaluation criteria stored in evaluation criteria data 216. In this example, multiplex module 206 accesses a "who is speaking" evaluation criterion, stored in evaluation criteria data 216 of database 114, that instructs multiplex module 206 to select the communication system stream that currently contains spoken words (such as, for example, from a speaking user) to function as the outbound teleconference stream. In this example, the user associated with computer 122a is speaking, and the users associated with computers 122b-122c are silent. Multiplex module 206 identifies spoken words in the communication system stream transmitted to cloud system 110 by computer 122a. Multiplex module 206 selects computer 122a communication system stream to function as the outbound teleconference stream. Graphical user interface module 204 accesses computer 122a communication system stream, generates an outbound teleconference stream comprising computer 122a communication system stream, and stores the outbound teleconference stream in outbound teleconference stream data 214.

Continuing the example, at action 308, administration module 202 transmits, using network 130 and communication links 140-146, the outbound teleconference stream to each of computers 122a-122c. Each of computers 122a-122c displays the outbound teleconference stream on the audiovisual display device associated with each computer 122a-122c. In this example, as the speaking user associated with computer 122a continues to speak, multiplex module 206 accesses the "who is speaking" evaluation criterion stored in evaluation criteria data 216 of database 114 to continually select, to serve as the outbound teleconference stream, the communication system stream transmitted by computer 122a. Multiplex module 206 continually monitors the communication system streams of each of computers 122a-122c using the "who is speaking" evaluation criterion.

Concluding the example, at a later point in time, the speaking user associated with computer 122a asks a question and stops speaking. The user associated with computer 122b begins to speak. Multiplex module 206 now selects the communication system stream from computer 122b to function as the outbound teleconference stream. In this example, graphical user interface module 204 seamlessly switches to computer 122b communication system stream and generates an updated outbound teleconference stream, which administration module 202 transmits to each of computers 122a-122c. When computers 122a-122c conclude the teleconference, teleconference system 100 terminates method 300.

Although the above example comprises three separate communication systems 120 (specifically, computers 122a-122c), communication systems 120 are described as examples only and teleconference system 100 is not limited by the number of communication systems 120 participating in the teleconference space. Embodiments contemplate teleconference system 100 allowing 50, 100, 500, or 1,000 separate communication systems 120 to join and participate in the teleconference space simultaneously. Administration module 202 may store data related to each of the 50, 100, 500, or 1,000 communication system streams in multiplex data 212. Multiplex module 206 may select, using one or more evaluation criteria, one or more of the 1,000 communication system streams to serve as the outbound teleconference stream, which graphical user interface module 204 may generate and which administration module 202 may transmit to each of the 50, 100, 500, or 1,000 communication systems 120 using network 130 and communication links 140-148.

According to embodiments, multiplex module 206 may mix and match visual and audio components from separate communication system streams in order to select data for the outbound teleconference stream. By way of example only and not by way of limitation, multiplex module 206 may select visual information from six separate communication system streams, while using separate audio evaluation criteria to identify a single speaking user and a single communication system stream from which to select the audio component of the outbound teleconference stream. Administration module 202 may transmit the visual components of the six separate selected communication system streams, as well as the selected audio component of the single communication system stream, as the outbound teleconference stream to each of participating communication systems 120. Communication system 120 communication devices may permit one or more users associated with each communication device to further customize the outbound teleconference stream information displayed on each communication device (such as, for example, choosing to display one or more, but not all, of the six visual components of the six communication system streams that comprise the outbound teleconference stream), as described in further detail below.

Figure 5:
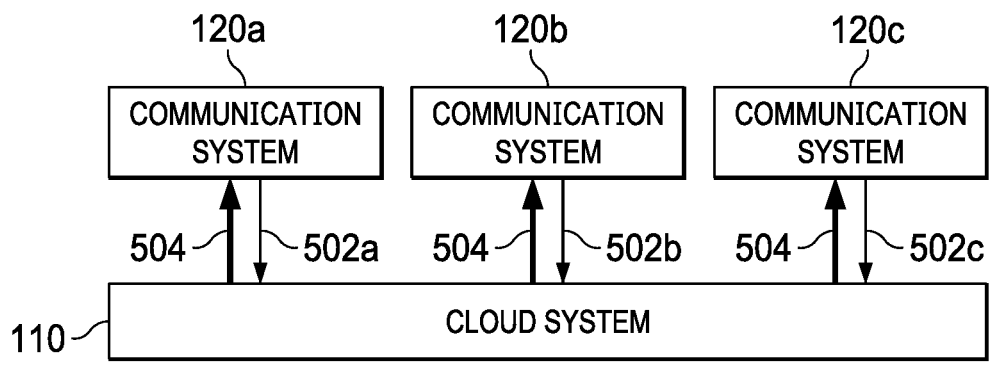
FIG. 5 illustrates exemplary communication system streams and an exemplary outbound teleconference stream, according to an embodiment.

FIG. 5 illustrates exemplary communication system streams and an exemplary outbound teleconference stream, according to an embodiment. FIG. 5 comprises three communication systems 120 (in the example illustrated by FIG. 5, communication systems 120a-120c) that participate in a teleconference space generated by cloud system 110. Although not illustrated in FIG. 5, network 130 and communication links 140-148 connect cloud system 110 to each of communication systems 120a-120c and support the transmission of data between cloud system 110 and communication systems 120a-120c. In this example, communication system 120a transmits communication system stream signal 502a to cloud system 110. Communication system 120b transmits communication system stream signal 502b to cloud system 110. Communication systems 120c transmits communication system stream signal 502c to cloud system 110. Cloud system 110 transmits outbound teleconference stream signal 504 to each of communication systems 120a-120c. Although FIG. 5 illustrates a particular configuration of cloud system 110, communication systems 120a-120c, communication system stream signals 502a-502c, and outbound teleconference stream signals 504, embodiments contemplate any configuration of cloud systems 110, communication systems 120, communication system stream signals 502, and/or outbound teleconference stream signals 504, according to particular needs.

FIG. 5 illustrates the flow of data between cloud system 110 and communication systems 120a-120c, according to an embodiment. Each of communication systems 120a-120c transmits a unique communication system stream (illustrated in FIG. 5 as communication system stream signals 502a-502c) to cloud system 110. In this embodiment, cloud system 110 follows the actions of method 300 discussed above, and generates a single outbound teleconference stream (illustrated in FIG. 5 as outbound teleconference stream signal 504), which cloud system 110 transmits to communication systems 120a-120c.

As illustrated in FIG. 5, teleconference system 100 reduces the information that each communication system 120a-120c must transmit to cloud system 110 and receive from cloud system 110 to participate in the teleconference space. According to embodiments, each communication system 120a-120c only transmits single communication system stream signal 502a-502c to cloud system 110, and receives only single outbound teleconference stream signal 504 from cloud system 110. Each communication system 120a-120c does not need to communicate directly with and/or send data to other communication systems 120a-120c in order to participate in teleconference system 100.

Figure 6A:
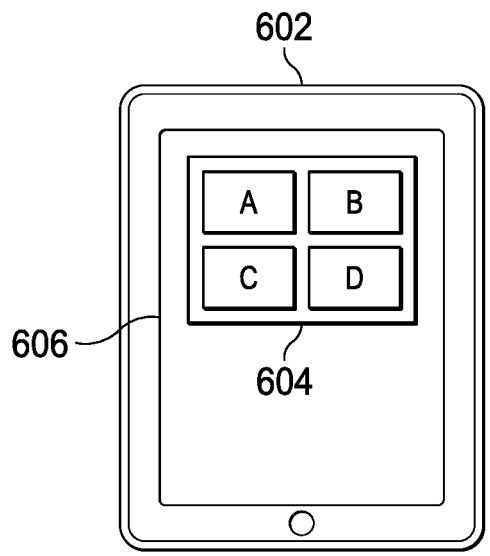
FIGS. 6A-6B illustrate an exemplary communication system tablet computer displaying an exemplary outbound teleconference stream display, according to an embodiment.

FIG. 6A illustrates exemplary communication system 120 tablet computer 602 displaying exemplary outbound teleconference stream display 604, according to an embodiment. As illustrated by FIG. 6A, tablet computer 602 displays outbound teleconference stream display 604, displaying the outbound teleconference stream transmitted to tablet computer 602 by cloud system 110 (not illustrated in FIG. 6A), using audiovisual display device tablet screen 606. Although FIG. 6A illustrates particular examples of tablet computer 602, outbound teleconference stream display 604, and tablet screen 606, embodiment contemplate any combination of tablet computer 602, outbound teleconference stream display 604, and tablet screen 606, according to particular needs.

In this example, cloud system 110 has selected four visual components from four separate communication system streams to serve as the visual component of the outbound teleconference stream transmitted to tablet computer 602 and displayed as outbound teleconference stream display 604. Each of these four visual components are illustrated as screens A-D, each of which represents separate communication system 120 and one or more users, on outbound teleconference stream display 604. Although not pictured in FIG. 6A, cloud system 110 also selects a single communication system stream audio component to serve as the audio component of the outbound teleconference stream.

Figure 6B:
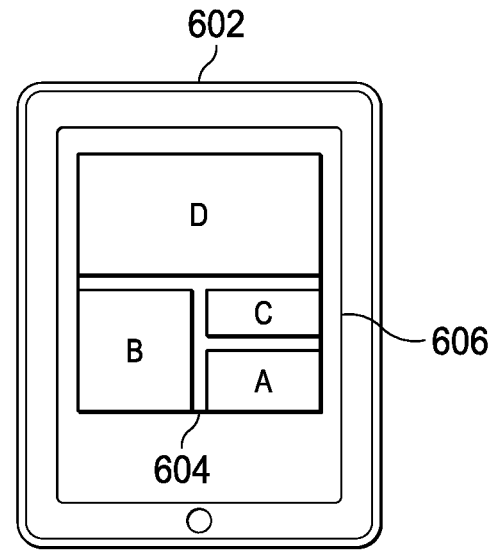

According to embodiments, administration module 202 may include, as part of outbound teleconference stream display 604, data which separately identifies each of the four visual components identified above. Each separate communication system 120 may use this information to arrange the visual component of outbound teleconference stream display 604 to emphasize or de-emphasize one or more specific communication systems 120, such as by expanding or contracting the display windows of each of the screens A-D, as illustrated in FIG. 6B. In other embodiments in which outbound teleconference stream display 604 comprises visual components from four separate communication system streams, multiplex module 206 may access and use a "who is speaking" evaluation criterion to transmit to administration module 202 information regarding how recently users associated with each of the separate communication system streams have spoken. Administration module 202 may transmit information regarding how recently users associated with each of the separate communication system streams have spoken to each communication system 120, which may use the information to arrange the visual component of outbound teleconference stream display 604 to emphasize (such as by expanding the display windows of one or more particular screens A-D) the specific communication systems 120 associated with users who have most recently spoken.

FIG. 6B illustrates tablet computer 602 displaying outbound teleconference stream display 604 in a second configuration, according to an embodiment. Continuing the example from FIG. 6A, FIG. 6B illustrates tablet computer 602 displaying outbound teleconference stream display 604 in a second display configuration. In the embodiment illustrated in FIG. 6B, tablet computer 602 has expanded screen D to fill the horizontal width of tablet screen 606, and has resized the other screens A-C accordingly. Embodiments contemplate permitting each communication device 120 to resize, expand, contract, or remove any number of displays representing any number of communication system streams within outbound teleconference stream display 604, without affecting the outbound teleconference stream cloud system 110 transmits to separate communication systems 120.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A system, comprising:
one or more communication devices; and
one or more cloud systems each comprising an administrator coupled with a database, the one or more cloud systems configured to:
generate a teleconference space;
receive and mix incoming audiovisual information from each of a select number of the one or more communication devices participating in the teleconference space;
transmit the mixed audiovisual information as a multiplex outbound teleconference stream to each of the one or more communication devices;
continuously update which of the number of incoming audiovisual information is avoided and which of the number of incoming audiovisual information is selected to comprise the multiplex outbound teleconference stream according to an evaluation criteria and a priority signal, the priority signal received from each of the one or more communication devices, wherein the priority signal comprises a binary value specifying whether each of the one or more communication devices is currently detecting audible sound, and wherein the evaluation criteria comprise predetermined keywords and a number of the one or more communication devices which most recently transmitted the priority signal; and
store data comprising a copy of the transmitted multiplex outbound teleconference stream to permit one or more communication devices to access and display the stored multiplex outbound teleconference stream at a later time.

2. The system of claim 1, wherein the selected number of the incoming audiovisual information is limited to a particular number.

3. The system of claim 1, wherein the one or more cloud systems are configured to:
generate a private teleconference space based on only including two or more identified communication devices.

4. The system of claim 1, wherein the one or more cloud systems are configured to:
maintain data at one or more locations external to the one or more cloud systems and made available to the one or more cloud systems via a network.

5. A computer-implemented method, comprising:
generating, using one or more cloud systems each comprising an administrator coupled with a database, a teleconference space in which one or more communication devices participate;
receiving and mixing, by the one or more cloud systems, incoming audiovisual information from each of a select number of the one or more communication devices participating in the teleconference space;
transmitting, by the one or more cloud systems, the mixed audiovisual information as a multiplex outbound teleconference stream to each of the one or more communication devices;
continuously updating, by the one or more cloud systems, which of the number of incoming audiovisual information is avoided and which of the number of incoming audiovisual information is selected to comprise the multiplex outbound teleconference stream according to an evaluation criteria and a priority signal, the priority signal received from each of the one or more communication devices, wherein the priority signal comprises a binary value specifying whether each of the one or more communication devices is currently detecting audible sound and wherein the evaluation criteria comprise predetermined keywords and a number of the one or more communication devices which most recently transmitted the priority signal; and storing, by the one or more cloud systems, data comprising a copy of the transmitted multiplex outbound teleconference stream to permit one or more communication devices to access and display the stored multiplex outbound teleconference stream at a later time.

6. The computer-implemented method of claim 5, wherein the selected number of the incoming audiovisual information is limited to a particular number.

7. The computer-implemented method of claim 5, further comprising:

generating, by the one or more cloud systems, a private teleconference space based on only including two or more identified communication devices.

8. The computer-implemented method of claim 5, further comprising:

maintaining, by the one or more cloud systems, data at one or more locations external to the one or more cloud systems and made available to the one or more cloud systems via a network.

9. A non-transitory computer-readable storage medium embodied with software, the software when executed configured to:

generate, using one or more cloud systems each comprising an administrator coupled with a database, a teleconference space in which one or more communication devices participate;

receive and mix incoming audiovisual information from each of a select number of the one or more communication devices participating in the teleconference space;

transmit the mixed audiovisual information as a multiplex outbound teleconference stream to each of the one or more communication devices;

continuously update which of the number of incoming audiovisual information is avoided and which of the number of incoming audiovisual information is selected to comprise the multiplex outbound teleconference stream according to an evaluation criteria and a priority signal, the priority signal received from each of the one or more communication devices, wherein the priority signal comprises a binary value specifying whether each of the one or more communication devices is currently detecting audible sound and wherein the evaluation criteria comprise predetermined keywords and a number of the one or more communication devices which most recently transmitted the priority signal; and store data comprising a copy of the transmitted multiplex outbound teleconference stream to permit one or more communication devices to access and display the stored multiplex outbound teleconference stream at a later time.

10. The non-transitory computer-readable storage medium of claim 9, wherein the selected number of the incoming audiovisual information is limited to a particular number.

11. The non-transitory computer-readable storage medium of claim 9, wherein the software when executed is configured to:

generate a private teleconference space based on only including two or more identified communication devices.

* * * * *